United States Patent
Jung

(10) Patent No.: US 9,237,328 B2
(45) Date of Patent: Jan. 12, 2016

(54) 3D IMAGE PROCESSING APPARATUS AND METHOD THEREOF USING CONNECTION STATUS AND GLASS TYPE SELECTION ICONS

(75) Inventor: Joon-Young Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 206 days.

(21) Appl. No.: 13/191,573

(22) Filed: Jul. 27, 2011

(65) Prior Publication Data

US 2012/0026302 A1   Feb. 2, 2012

(30) Foreign Application Priority Data

Jul. 27, 2010  (KR) .................. 10-2010-0072310
Jul. 30, 2010  (KR) .................. 10-2010-0074216

(51) Int. Cl.
*H04N 13/02* (2006.01)
*H04N 13/00* (2006.01)

(52) U.S. Cl.
CPC ....... *H04N 13/0059* (2013.01); *H04N 13/0066* (2013.01)

(58) Field of Classification Search
CPC .......... H04N 13/0066; H04N 13/0409; H04N 13/0404; H04N 13/0497; H04N 13/0059
USPC ........... 348/51; 375/240.01, 240.26; 725/111, 725/38; 703/2
See application file for complete search history.

(56) References Cited

U.S. PATENT DOCUMENTS

| | | | |
|---|---|---|---|
| 5,001,555 A * | 3/1991 | Park ................................. 348/43 |
| 8,391,135 B1 * | 3/2013 | Kuhn ............................ 370/227 |
| 2003/0016633 A1 * | 1/2003 | Enns et al. .................... 370/316 |
| 2007/0204294 A1 * | 8/2007 | Walker et al. .................. 725/38 |
| 2007/0294063 A1 * | 12/2007 | Li et al. ............................. 703/2 |
| 2008/0089428 A1 * | 4/2008 | Nakamura et al. ........ 375/240.26 |
| 2008/0159507 A1 * | 7/2008 | Virolainen et al. ...... 379/202.01 |
| 2008/0216113 A1 * | 9/2008 | Yun et al. ........................ 725/33 |
| 2008/0310499 A1 * | 12/2008 | Kim et al. ................ 375/240.01 |
| 2009/0034556 A1 * | 2/2009 | Song et al. ..................... 370/471 |
| 2009/0144767 A1 * | 6/2009 | Kim ................................ 725/38 |
| 2009/0245347 A1 * | 10/2009 | Lee et al. ................. 375/240.01 |
| 2009/0268806 A1 * | 10/2009 | Kim et al. ................ 375/240.01 |
| 2010/0005510 A1 * | 1/2010 | Weber et al. ..................... 726/4 |

(Continued)

FOREIGN PATENT DOCUMENTS

| | | |
|---|---|---|
| JP | 2008-182669 | 8/2008 |
| JP | 2009-4942 | 1/2009 |

OTHER PUBLICATIONS

Joon-Young Jung et al., "Signaling of Multi-channel for High Definition Dual-stream 3DTV Services", International Conference on Consumer Electronics 2011, Jan. 11, 2011, 2pp.

*Primary Examiner* — Jay Patel
*Assistant Examiner* — Joseph Suh
(74) *Attorney, Agent, or Firm* — Staas & Halsey LLP

(57) ABSTRACT

A method for transmitting a multi-view program composed of a plurality of video streams in a digital broadcasting system includes generating information representing that the program is a multi-view program, information on a composition of the multi-view program and information on the plurality of physical channels through which the multi-view program is transmitted; and transmitting the multi-view program and the generated information through the plurality of physical channels.

21 Claims, 7 Drawing Sheets

(56) References Cited

U.S. PATENT DOCUMENTS

| | | | |
|---|---|---|---|
| 2010/0017833 A1* | 1/2010 | Abramson et al. | 725/111 |
| 2010/0141738 A1* | 6/2010 | Lee et al. | 348/43 |
| 2010/0150247 A1* | 6/2010 | Kim | 375/240.25 |
| 2010/0185746 A1* | 7/2010 | Suh et al. | 709/217 |
| 2010/0202759 A1* | 8/2010 | Sasaki et al. | 386/108 |
| 2010/0303442 A1* | 12/2010 | Newton et al. | 386/241 |
| 2010/0313236 A1* | 12/2010 | Straub | 725/146 |
| 2011/0035772 A1* | 2/2011 | Ramsdell et al. | 725/36 |
| 2011/0103473 A1* | 5/2011 | Li et al. | 375/240.12 |
| 2011/0309999 A1* | 12/2011 | Chang et al. | 345/1.1 |

\* cited by examiner

FIG. 3

| SYNTAX | NUMBER OF BITS | REMARK |
|---|---|---|
| mult i_channel_descriptor ( ) { | | |
| 305 — descriptor_tag | 8 | 0xD0 |
| 310 — descriptor_length | 8 | |
| reserved | 4 | " 1111 " |
| 315 — num_subchannels | 4 | |
| for (i =0 ; i<num_subchanne Is; i++) { | | |
| 320 — subchanne l_type | 8 | SEE TABLE 1 |
| 325 — subchannel_frequency | 32 | |
| 330 — modul ati on_mode | 8 | SEE TABLE 2 |
| } | | |
| } | | |

FIG. 4

| SYNTAX | NUMBER OF BITS | REMARK |
|---|---|---|
| 3D_program_descriptor ( ) { | | |
| descriptor_tag | 8 | 0xc0 |
| descriptor_length | 8 | |
| reserved | 7 | " 1111111 " |
| 3D_f lag | 1 | |
| if (3d_flag) { | | |
| reserved | 4 | " 1111 " |
| 3D_composi t ion_type | 4 | SEE TABLE 4 |
| if (3D_composition_type = two_video_stream){ | | |
| reserved | 5 | " 11111 " |
| subchannel_present | 1 | |
| LR_first_flag | 1 | |
| 2D_view_flag | 1 | |
| } | | |
| } | | |
| } | | |

405 — descriptor_tag
410 — descriptor_length
415 — 3D_f lag
420 — 3D_composi t ion_type
425 — subchannel_present
430 — LR_first_flag
435 — 2D_view_flag

FIG. 5

| SYNTAX | NUMBER OF BITS | REMARK |
|---|---|---|
| stereoscopic_ES_info_descriptor ( ) { | | |
| 505 — descriptor_tag | bit (8) | 0xC1 |
| 510 — descriptor_length | bit (8) | |
| 515 — stereoscopic_stream_type | bit (8) | |
| reserved | bit (2) | |
| 520 — stereoscopic_view_info_flag | bit (1) | |
| 525 — stereoscopic_group_PID | bit (13) | |
| } | | |

# 3D IMAGE PROCESSING APPARATUS AND METHOD THEREOF USING CONNECTION STATUS AND GLASS TYPE SELECTION ICONS

CROSS-REFERENCES TO RELATED APPLICATIONS

The present application claims priority of Korean Patent Application Nos. 10-2010-0072310 and 10-2010-0074216, filed on Jul. 27, 2010 and Jul. 30, 2010, respectively, which are incorporated herein by reference in their entireties.

BACKGROUND OF THE INVENTION

1. Field of the Invention

Exemplary embodiments of the present invention relate to a method and apparatus for transmitting/receiving a multi-view program including a stereoscopic 3D program in a digital broadcasting system; and, more particularly, to a method and apparatus for transmitting/receiving a multi-view program composed of a plurality of video streams through a plurality of physical channels while maintaining service compatibility with a conventional 2D receiver.

2. Description of Related Art

In digital broadcasting systems, channels do not means physical radio frequency (RF) channels but mean virtual channels.

Conventional digital broadcasting systems have a structure in which data is transmitted through one or more logical virtual channels within one physical RF channel. For example, in a conventional two-dimensional (2D) digital broadcasting system, a program has one video stream, and the video stream is generally transmitted through virtual channels within one physical RF channel.

Meanwhile, since a stereoscopic 3D image expresses a 3D effect using a difference in visual angle between a left-view image (hereinafter, referred to as a 'left image') and a right-view image (hereinafter, referred to as a 'right image'), a stereoscopic 3D program has video streams for the left and right images to be transmitted. There are several methods for transmitting a video stream composed of left and right images. For example, a first method, as illustrated in FIG. 1A, is a method of decreasing the resolution of left and right images by a half with respect to width, combining the left and right images together as one image frame and then compressing the image frame, thereby transmitting the compressed image frame as one video stream. A second method is a method of decreasing the resolution of left and right images by a half with respect to length, combining the left and right images together as one image frame and then compressing the image frame, thereby transmitting the compressed image frame as one video stream. A third method, as illustrated in FIG. 1B, is a method of compressing left and right images for each frame and then transmitting the compressed left and right images as two video streams. For reference, in FIGS. 1A and 1B, "L" denotes a left image and "R" denotes a right image. In the first and second methods, an image having a resolution decreased by a half is transmitted, and therefore, deterioration of image quality occurs. However, in the third method, 3D watching is possible without deterioration of image quality. When comparing these methods in terms of transmission, the first and second methods have no difference from the conventional method of transmitting the 2D program. However, in the third method, two video streams are transmitted, and therefore, the quantity of data to be transmitted may exceed the capacity of one physical RF channel. In this case, there occurs a problem in that the two video streams are transmitted through one physical RF channel, like the conventional method of transmitting the 2D program.

If the method of transmitting video streams is not limited to a stereoscopic 3D program having two video streams to be transmitted but extended to a multi-view program having several video streams to be transmitted, it is almost impossible to transmit the multi-view program through one physical RF channel.

As described above, there is a limitation in transmitting a multi-view program including a stereoscopic 3D program through one physical RF channel, and therefore, the multi-view program is necessarily transmitted through two or more physical RF channels.

Since the capacity of the virtual channel through which the 2D program is transmitted does not exceed the capacity of the one physical RF channel, it is not generally considered in signaling information for receiving the conventional 2D program that a plurality of physical RF channels are received, and video streams transmitted through the respective physical channels are linked. Therefore, signaling information for receiving a virtual channel through which a multi-view program including a stereoscopic 3D program transmitted within a plurality of physical RF channels is necessarily contained in the signaling information for receiving the conventional 2D program.

Although the quantity of data of the 3D program having two video streams does not exceed the capacity of the one physical RF channel, the signaling information for receiving the virtual channel through which the multi-view program including the stereoscopic 3D program transmitted within the plurality of physical RF channels is necessarily provided even when watching the stereoscopic 3D program by transmitting a video stream corresponding to the right image through a separate physical RF channel, transmitting a video stream corresponding to the left image through the conventional 2D program channel and then liking video streams transmitted from a receiving stage to each of the channels so that the configuration of channels built to transmit the conventional 2D program is not changed.

SUMMARY OF THE INVENTION

An embodiment of the present invention is directed to a method and apparatus for transmitting/receiving a multi-view program in a digital broadcasting system, in which when one virtual channel through which a multi-view program including a stereoscopic 3D program is transmitted is used as a plurality of physical channels, signaling information for receiving the virtual channel at a receiving stage and linking video streams transmitted through each of the physical channels is provided.

Another embodiment of the present invention is directed to a method and apparatus for transmitting/receiving a multi-view program in a digital broadcasting system, in which signaling information added to transmit a multi-view program including a stereoscopic 3D program does not cause a malfunction in the conventional 2D program receiver.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for transmitting a multi-view program in a digital broadcasting system includes generating information representing that the program is a multi-view program, information on a composition of the multi-view program and information on the plurality of physical channels through which the multi-view program is transmitted; and transmitting the multi-view program and the generated information through the plurality of physical channels, wherein the plurality of video streams are one reference video stream and one or more additional video streams, wherein the reference video stream is a video stream containing a reference image, and the additional video stream is a video stream containing an additional image; the information on the composition of the multi-view program contains information representing that the multi-view program is composed of a plurality of video streams and information representing that the plurality of video streams are transmitted through the plurality of physical channels; the information on the plurality of physical channels contains information on a main physical channel through which the reference video stream is transmitted, the number of physical subchannels through which the additional video stream is transmitted and information on each of the physical subchannels; and said transmitting transmits the video stream through each of the physical channels based on the information on the composition of the multi-view program and the information on the plurality of physical channels.

In accordance with another embodiment of the present invention, a method for receiving a multi-view program in a digital broadcasting system includes receiving information representing that the program is a multi-view program, information on a composition of the multi-view program and information on the plurality of physical channels through which the multi-view program is transmitted; obtaining information representing that the multi-vie program is composed of a plurality of video streams and information representing that the plurality of video streams are transmitted through the plurality of physical channels from the information on the composition of the received multi-view program, and obtaining information on a main physical channel through which the reference video stream is transmitted, the number of physical subchannels through which the additional video stream is transmitted and information on each of the physical subchannels from the received information on the plurality of physical channels; and receiving the plurality of video streams of the multi-view program through the respective physical channels based on the obtained information, wherein the plurality of video streams are one reference video stream and one or more additional video streams, wherein the reference video stream is a video stream containing a reference image, and the additional video stream is a video stream containing an additional image.

In accordance with another embodiment of the present invention, an apparatus for transmitting a multi-view program in a digital broadcasting system includes a generation unit configured to generate information representing that the program is a multi-view program, information on a composition of the multi-view program and information on the plurality of physical channels through which the multi-view program is transmitted; and a transmission unit configured to transmit the multi-view program and the generated information through the plurality of physical channels, wherein the plurality of video streams are one reference video stream and one or more additional video streams, wherein the reference video stream is a video stream containing a reference image, and the additional video stream is a video stream containing an additional image; the information on the composition of the multi-view program contains information representing that the multi-view program is composed of a plurality of video streams and information representing that the plurality of video streams are transmitted through the plurality of physical channels; the information on the plurality of physical channels contains information on a main physical channel through which the reference video stream is transmitted, the number of physical subchannels through which the additional video stream is transmitted and information on each of the physical subchannels; and the transmission unit transmits the video stream through each of the physical channels based on the information on the composition of the multi-view program and the information on the plurality of physical channels.

In accordance with another embodiment of the present invention, an apparatus for receiving a multi-view program in a digital broadcasting system includes a reception unit configured to receive information representing that the program is a multi-view program, information on a composition of the multi-view program and information on the plurality of physical channels through which the multi-view program is transmitted; and a control unit configured to obtain information representing that the multi-vie program is composed of a plurality of video streams and information representing that the plurality of video streams are transmitted through the plurality of physical channels from the information on the composition of the received multi-view program, and obtain information on a main physical channel through which the reference video stream is transmitted, the number of physical subchannels through which the additional video stream is transmitted and information on each of the physical subchannels from the received information on the plurality of physical channels, wherein the reception unit receives the plurality of video streams of the multi-view program through the respective physical channels based on the obtained information; and the plurality of video streams are one reference video stream and one or more additional video streams, wherein the reference video stream is a video stream containing a reference image, and the additional video stream is a video stream containing an additional image.

BRIEF DESCRIPTION OF THE DRAWINGS

FIG. 3 illustrates a multi-channel descriptor (multi_channel_descriptor) in accordance with an embodiment of the present invention.

FIG. 4 illustrates a 3D program descriptor (3D_program_descriptor) in accordance with an embodiment of the present invention.

FIG. 5 illustrates an additional video stream information descriptor (stereoscopic_ES_info_descriptor) in accordance with an embodiment of the present invention.

DESCRIPTION OF SPECIFIC EMBODIMENTS

Figure 1A:
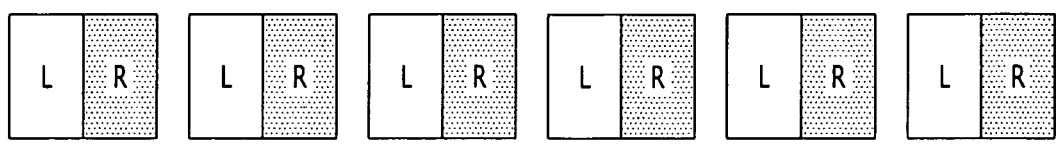
FIGS. 1A and 1B illustrate methods for composing video streams in a stereoscopic 3D program.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Exemplary embodiments of the present invention relate to a method and apparatus for transmitting/receiving a multi-view program composed of a plurality of video streams through a plurality of physical channels. The multi-view program refers to a program composed of two or more view images. For example, the multi-view program is a stereoscopic 3D program that expresses a 3D effect using a difference in visual angle between a left-view image (hereinafter, referred to as a 'left image') and a right-view image (hereinafter, referred to as a 'right image'). The physical channel refers to a channel through which data (e.g., programs) are substantially transmitted. For example, the physical channel is a radio frequency (RF) channel.

First, a case where one virtual channel is composed of a plurality of physical channels in the present invention will be described with reference to an embodiment of FIG. 2. The one virtual channel refers to a channel through which one program is transmitted. In accordance with the present invention, the one virtual channel may be composed of as a plurality of physical channels.

Figure 2:
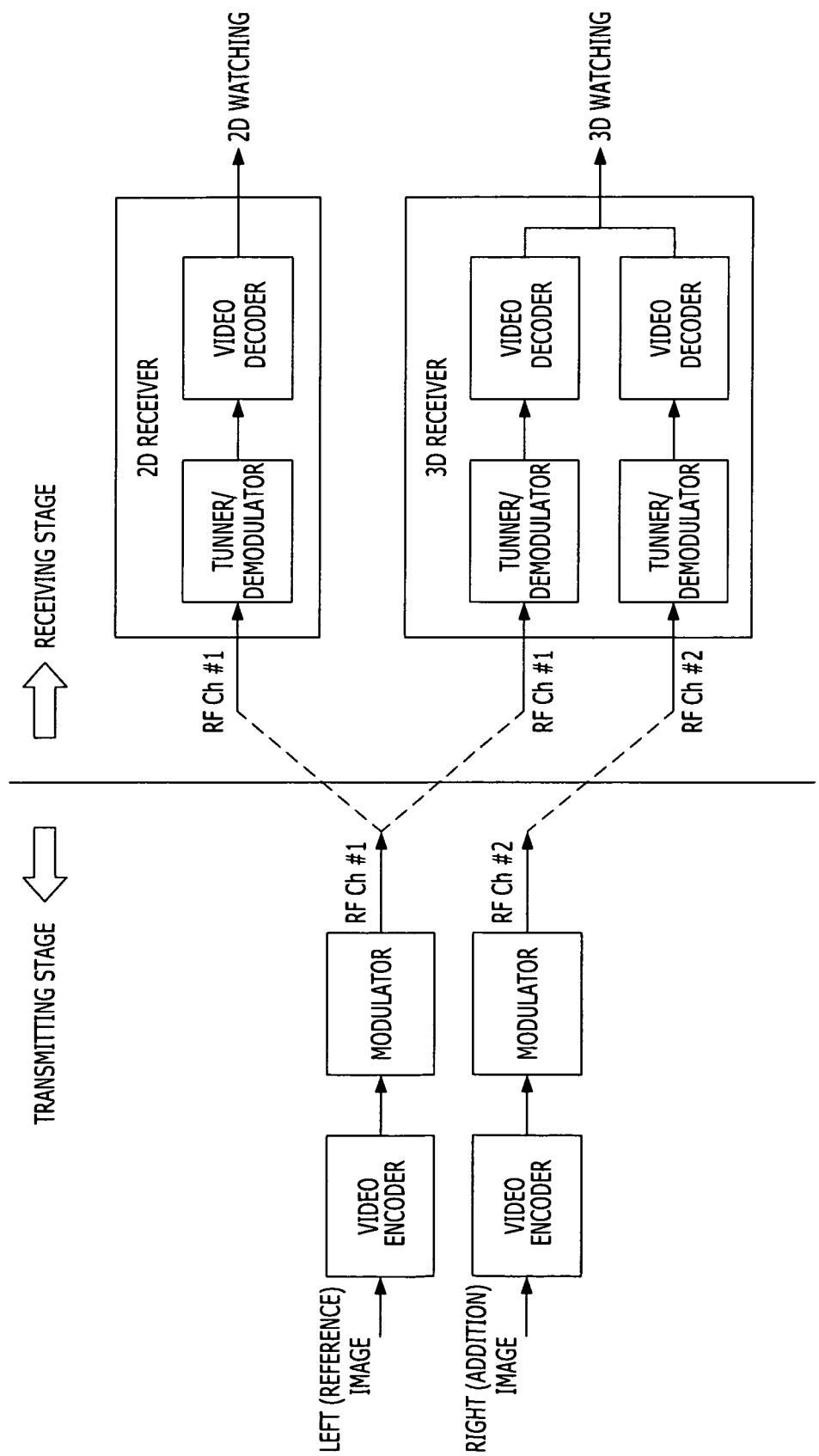
FIG. 2 illustrates a method for transmitting/receiving a stereoscopic 3D program composed of two video streams through two physical channels in accordance with an embodiment of the present invention.

FIG. 2 illustrates a method for transmitting/receiving a stereoscopic 3D program composed of two video streams through two physical channels in accordance with an embodiment of the present invention. Specifically, a transmitting stage generates two video streams by encoding left and right images using a video encoder, and modulates each of the generated video streams using a modulator. Then, the modulated video streams are transmitted through an RF channel 1 (RF Ch#1) and an RF channel 2 (RF Ch#2), respectively. Here, it is assumed that the left image is a reference image and the right image is an additional image. The reference image refers to an image that a conventional 2D broadcasting receiver compatibly recognizes and reproduces or that the conventional 2D broadcasting receiver reproduces when its mode is converted into a 2D reproduction mode. The additional image refers to an image having a view different from that of the reference image. In a digital broadcasting system, the conventional 2D broadcasting receiver and a 3D broadcasting receiver may exist together as illustrated in FIG. 2. The conventional 2D broadcasting receiver receives a left (reference) image transmitted through the RF channel 1 (RF Ch#1) and reproduces a 2D program, thereby enabling a user to watch 2D broadcasting. The 3D broadcasting receiver receives left (reference) and right (additional) images respectively transmitted through the RF channel 1 (RF Ch#1) and the RF channel 2 (RF Ch#2) and reproduces a stereoscopic 3D program, thereby enabling the user to watch 3D broadcasting.

In order to implement the embodiment of FIG. 2, the use of the two RF channels is necessarily stated in signaling information on a virtual channel through which the corresponding stereoscopic 3D program is transmitted. Although the conventional 2D broadcasting receiver obtains the signaling information on the virtual channel, the conventional 2D broadcasting receiver necessarily recognizes only the RF channel through which the reference image is transmitted. To this end, in the present invention, information on a plurality of RF channels is added to the signaling information on the virtual channel, the added information does not cause a malfunction in the conventional 2D broadcasting receiver, thereby receiving the reference image without any problems.

The signaling information in accordance with the present invention is provided based on the digital terrestrial broadcasting standard of the Advanced Television System Committee (ATSC) and the digital cable broadcasting standard of the OpenCable.

Service information related to channels and programs is provided to receivers based on the Program and System Information Protocol (PSIP), and is defined by Service Information (SI) in the digital cable broadcasting standard of the OpenCable. The service information uses the Program Specific Information (PSI) defined in the Moving Picture Experts Group (MPEG)-2 system for the purpose of multiplexing of common programs. The PSI, PSIP and SI are composed of tables having the section structure of the MPEG-2 as a set of data structures.

In the PSIP, information on service channels is provided to receivers through a virtual channel table (VCT). In the SI, the information on service channels is provided to receivers through a short form-VCT (S-VCT) or long form-VCT (L-VCT).

In the present invention, in order to state that a virtual channel is composed of a plurality of physical channels, a multi-channel descriptor (multi_channel_descriptor) illustrated in FIG. 3 is defined, and the multi-channel descriptor (multi_channel_descriptor) is transmitted in the state that it is contained in a descriptor loop for each virtual channel in the aforementioned table.

The multi-channel descriptor (multi_channel_descriptor) contains information on a physical subchannel through which an additional video stream is transmitted, except a main physical channel that is a physical channel through which a reference video stream is transmitted, with respect to a corresponding virtual channel. The reference video stream is a video stream containing the reference image and the additional video stream is a video stream containing the additional image.

Referring to FIG. 3, descriptor_tag 305 is a field for identifying a descriptor, and has a value of 0xD0 as an embodiment. Descriptor_length 310 is a field for representing the length of the multi-channel descriptor (multi_channel_descriptor), and may represent the number of bytes posterior to the descriptor_length 310 as an embodiment.

Num_subchannels 315 represents the number of physical subchannels except the main physical channel with respect to the corresponding virtual channel. In a stereoscopic 3D broadcasting service composed of one reference video stream and one additional video stream, the number of physical subchannels (num_subchannels 315) has a value of '1' when the reference and additional video streams are transmitted through physical channels different from each other. In a multi-view broadcasting service, the number of physical subchannels may be more increased. Here, a value of '0' cannot be used as the num_subchannels 315.

Information on at least one of subchannel_type 320, subchannel_frequency 325 and modulation_mode 330, with respect to each of the physical subchannels having the number of the num_subchannels 315, may be described.

The subchannel_type 320 represents a type of the physical subchannel. For example, a value defined in the following Table 1 may be used as the subchannel_type 320. As an embodiment, 0x01 represents that the corresponding physical subchannel is a physical subchannel of a stereoscopic 3D program. The stereoscopic 3D program is composed of one reference video stream and one additional video stream, and thus the additional video stream of the stereoscopic 3D program is transmitted through the corresponding physical subchannel. That is, the subchannel_type 320 represents information on a video stream transmitted through the corresponding physical subchannel, and a value of 0x02 to 0x1F may be used to perform multi-view broadcasting from now on. For example, in a case where a first view image is a reference image and second and third view images are additional images in a multi-view program (3-view program) composed of the first, second and the third view images, the subchannel_type 320 may represent that the corresponding physical subchannel is a physical subchannel of the 3-view program. More specifically, the corresponding physical subchannel may represent that a video stream for the second view image of the additional images is transmitted therethrough.

TABLE 1

| Value | Description |
|---|---|
| 0x00 | Reserved |
| 0x01 | Sub-channel for 3D Program |
| 0x02~0x1F | reserved for future use |
| 0x2F~0xFF | reserved |

The subchannel_frequency 325 represents a carrier frequency of the corresponding physical subchannel, and may be expressed as an unsigned integer of 32 bits.

The modulation_mode 330 represents a modulation_mode of the physical subchannel. For example, a value defined in the following Table 2 may be used as the modulation_mode 330. In Table 2, 0x08 represents that the modulation_mode of the corresponding physical subchannel is described in private_descriptor that is a descriptor defined by a user.

TABLE 2

| Value | Description |
|---|---|
| 0x00 | reserved |
| 0x01 | Analog |
| 0x02 | SCTE_mode_1: 64-QAM |
| 0x03 | SCTE_mode_2: 256-QAM |
| 0x04 | ATSC(8 VSB) |
| 0x05 | ATSC(16 VSB) |
| 0x06~0x7F | reserved for future use |
| 0x08 | Modulation parameters are defined by a private descriptor |
| 0x81~0xFF | User private |

The multi-channel descriptor (multi_channel_descriptor) may contain a reserved field as illustrated in FIG. 3. Each of the fields defined in the multi-channel descriptor (multi_channel_descriptor) described above may be used individually or through various combinations. Each of the fields may also be used in various tables defined in the digital broadcasting system or user (private) data areas of a packetized elementary stream (PES).

Hereinafter, a case where the multi-channel descriptor (multi_channel_descriptor) is applied to a VCT for signaling channel information in the digital terrestrial broadcasting of the ATSC standard will be described as an embodiment of the present invention. An embodiment for an S-VCT or an L-VCT of the SI is identical to that for the VCT, and therefore, its description will be omitted. Table 3 illustrates the structure of a VCT table defined in the ATSC, and description of each data field defined in the corresponding standard will be omitted.

TABLE 3

| Syntax | Number of bits | Remark |
|---|---|---|
| Terrestrial_virtual_channel_table_section( ) { | | |
|   table_id | 8 | |
|   section_syntax_indicator | 1 | |
|   private_indicator | 1 | |
|   reserved | 2 | |
|   section_length | 12 | |
|   transport_stream_id | 16 | |
|   reserved | 2 | |
|   version_number | 5 | |
|   current_next_indicator | 1 | |
|   section_number | 8 | |
|   last_section_number | 8 | |
|   protocol_version | 8 | |
|   num_channels_in_section | 8 | |
|   for (i=0; i< num_channels_in_section; i++) { | | First for loop |
|     short_name | 7*16 | |
|     reserved | 4 | |
|     major_channel_number | 10 | |
|     minor_channel_number | 10 | |
|     modulation_mode | 8 | |
|     carrier_frequency | 32 | |
|     channel_TSID | 16 | |
|     program_number | 16 | |
|     ETM_location | 2 | |
|     access_controlled | 1 | |
|     hidden | 1 | |
|     reserved | 2 | |
|     hide_guide | 1 | |
|     reserved | 3 | |
|     service_type | 6 | |
|     source_id | 16 | |
|     reserved | 6 | |
|     descriptors_length | 10 | |
|     for (i=0; i<N; i++) { | | Second for loop |
|       descriptor( ) | | Insert multi_channel_descriptor |
|     } | | |
|   } | | |
|   reserved | 6 | |
|   additional_descriptors_length | 10 | |
|   for (j=0; j<N; j++) { | | |
|     additional_descriptor( ) | | |
|   } | | |
|   CRC32 | 32 | |

In the VCT table syntax of Table 3, fields contained in the first for loop represents information on one virtual channel. If the first for loop into which a descriptor is inserted exists in the first for loop, and the multi-channel descriptor (multi_channel_descriptor) defined in the present invention may be inserted into the second for loop. Accordingly, it can be expressed that one virtual channel is composed of a plurality of physical channels. That is, physical channel relative contents (modulation_mode, carrier_frequency) indicated in the first for loop of the VCT represent information on the main physical channel through which the reference image is transmitted, and RF channel information of the physical subchannel, through which the additional image is transmitted, is represented by the multi-channel descriptor (multi_channel_descriptor).

Since the inserted multi-channel descriptor (multi_channel_descriptor) is recognized as a private descriptor that cannot be interpreted in the conventional 2D broadcasting receiver, a malfunction does not occur. The conventional 2D broadcasting receive obtains only the information on the physical channel through which the reference image is transmitted, so that it is possible to watch a 2D program. However, the multi-view broadcasting receiver for receiving a multi-view program including a stereoscopic 3D program can reproduce the multi-view program by analyzing information of the multi-channel descriptor (multi_channel_descriptor), recognizing that the corresponding virtual channel is composed of a plurality of physical channels, and receiving the corresponding physical channels.

Until now, the multi-channel descriptor (multi_channel_descriptor) has been proposed as a method for providing signaling information when one virtual channel is composed of a plurality of physical channels, and applications of the multi-channel descriptor (multi_channel_descriptor) have been described in detail. While it can be recognized through the provided channel information that the corresponding virtual channel is composed of the plurality of physical channels, information on the composition of a program transmitted through the channel is not provided. In an example of the stereoscopic 3D program in FIG. 2, it is necessary to recognize that one program is composed of two video streams and the corresponding program is a stereoscopic 3D program.

Thus, as illustrated in FIG. 4, a 3D program descriptor (3D_program_descriptor) is defined in the present invention so as to perform signaling of information on the stereoscopic 3D program. The 3D program descriptor (3D_program_descriptor) represents information on the composition of the stereoscopic 3D program, and may be extended to information on the composition of the multi-view program.

Referring to FIG. 4, descriptor_tag 405 is a field for identifying a descriptor, and has a value of 0xC0 as an embodiment. Descriptor_length 410 is a field for representing the length of the 3D program descriptor (3D_program_descriptor), and may represent the number of bytes posterior to the descriptor_length 410 as an embodiment.

3D_flag 415 is information on whether a corresponding program is the stereoscopic 3D program. As an embodiment, '1' may be used when the corresponding program is the stereoscopic 3D program, and '0' may be used when the corresponding program is the conventional 2D program. The presence of the stereoscopic 3D program may be identified through a value of the 3D_flag 415 or the presence of the 3D program descriptor (3D_program_descriptor). In an extended embodiment, the 3D_flag 415 may represent whether the corresponding program is the multi-view program. In a modification, may represent how many view images the corresponding program is composed by adding the number of bits.

Figure 1B:
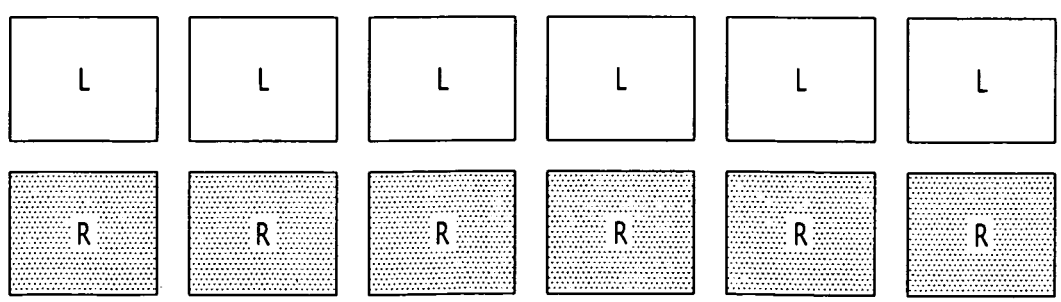

3D_composition_type 420 represents a composition type of the stereoscopic 3D program. For example, a value defined in the following Table 4 may be used as the 3D_composition_type. Referring to Table 4, '0001' represents, as a side-by-side method, a method of decreasing the resolution of left and right images by a half with respect to width, combining the left and right images together as one image frame and then compressing the image frame, thereby transmitting the compressed image frame as one video stream, as illustrated in FIG. 1. '0010' represents, as a top down method (referred to as a 'top and bottom' method), a method of decreasing the resolution of left and right images by a half with respect to length, combining the left and right images together as one image frame and then compressing the image frame, thereby transmitting the compressed image frame as one video stream. '0011' represents, a frame sequential method, a method of alternately arranging left and right image frames, compressing the arranged image frames and then transmitting the compressed image frames as one video stream. '0100' and '0101' represent a method transmitting a 2D video stream and a stereoscopic 3D video stream using a frame compatible method (one of the side-by-side method and the top down method) at the same time. '0110' represents a method of individually compressing left and right image frames and then transmitting the compressed image frames as two video streams. As describe above, the composition of one or more video streams of the stereoscopic 3D program using each of the view images and the number of the video streams can be recognized through the 3D_composition_type 420. In an extended embodiment, the 3D_composition_type 420 may represent a composition type of the multi-view program. For example, '0111' to '1111' in the following Table 4 may be used as the 3D_composition_type 420.

TABLE 4

| Value | Description | |
|---|---|---|
| 0000 | Reserved | |
| 0001 | Frame compatible | Side by Side |
| 0010 | | Top Down |
| 0011 | Frame sequential | The images in a stereo pair are presented alternately to the left and right eyes fast enough to be merged into a single 3D image |
| 0100 | 2D + Frame compatible | L + side by side |
| 0101 | | L + top and bottom |
| 0110 | Two Video Streams | Left visual stream + Right visual stream |
| 0111~1111 | Reserved for future use | |

Subchannel_present 425 refers to information representing whether the stereoscopic 3D program is transmitted through a plurality of physical channels, i.e., whether physical subchannels are used. For example, in a case where the composition type of the stereoscopic 3D program (3D_composition_type) is individual two streams (a reference video stream and an additional video stream), the Subchannel_present 425 has a value of '1' when a separate physical channel (physical subchannel) is used in the transmission of the additional video stream, and the Subchannel_present 425 has a value of '0' when the two video streams are all transmitted through one physical channel. In an extended embodiment, the subchannel_present 425 may represent whether the multi-view program is transmitted through a plurality of physical channels, i.e., whether physical subchannels are used.

LR_first_flag 430 represents which view image is a reference image in the stereoscopic 3D program. For example, the LR_first_flag 430 may have a value of '1' when the reference image is a left image, and the LR_first_flag 430 may have a value of '0' when the reference image is a right image. In an extended embodiment, the LR_first_flag 430 represents which view image is a reference image in the multi-view program. For example, the LR_first_flag 430 may have a value of '1' when a first view image is the reference image by adding the number of bits, and the LR_first_flag 430 may have a value of '2' when a second view image is the reference image by adding the number of bits.

2D_view_flag 435 is a field for identifying an appropriate image when a 3D receiver receives a stereoscopic 3D program so as to watch the received program in a 2D program mode. For example, a reference image is displayed when the 2D_view_flag 435 has a value of '1', and an additional image in the 2D program mode when the 2D_view_flag 435 has a value of '0'. In the frame compatible method, video located at the left (the side-by-side method) or top (the top and bottom method) of an image is displayed in the 2D program mode when the 2D_view_flag 435 has a value of '1', and video located at the right or bottom of the image is displayed in the 2D program mode. In an extended embodiment, the 2D_view_flag 435 may display an appropriate image when the 3D receiver receives a multi-view program so as to watch the received program in the 2D program mode, and the number of bits may be added as occasion demands.

The 3D program descriptor (3D_program_descriptor) may contain a reserved field as illustrated in FIG. 4. Each of the fields defined in the 3D program descriptor (3D_program_descriptor) described above may be used individually or through various combinations. Each of the fields may also be used in various tables defined in the digital broadcasting system or user (private) data areas of the PES.

In accordance with various embodiments, the 3D program descriptor (3D_program_descriptor) may be inserted into a program map table (PMT) in the PSI defined for the purpose of multiplexing of programs in the MPEG-2 system. Alternatively, the 3D program descriptor (3D_program_descriptor) may be inserted into an event information table (EIT) in the PSIP for providing guide information on programs or an aggregated EIT (AEIT) in the SI.

Hereinafter, a case where the 3D program descriptor (3D_program_descriptor) is applied to the PMT for signaling program multiplexing information in the MPEG-2 will be described as an embodiment. Table 5 illustrates a structure the PMT defined in the MPEG-2 system, and description of each data field defined by the corresponding standard will be omitted.

TABLE 5

| Grammar | Number of bits | Restriction |
|---|---|---|
| TS_program_map_section( ) { | | |
|   table_id | 8 | |
|   section_syntax_indicator | 1 | |
|   '0' | 1 | |
|   Reserved | 2 | |
|   section_length | 12 | |
|   program_number | 16 | |
|   Reserved | 2 | |
|   version_number | 5 | |
|   current_next_indicator | 1 | |
|   section_number | 8 | |
|   last_section_number | 8 | |
|   Reserved | 3 | |
|   PCR_PID | 13 | |
|   Reserved | 4 | |
|   program_info_length | 12 | |
|   for (i=0; i<N; i++) { | | First for loop |
|     descriptor( ) | | Insert 3D_program_descriptor |
|   } | | |
|   for (i=0; i<N1; i++) { | | Second for loop |
|     stream_type | 8 | |
|     Reserved | 3 | |
|     elementary_PID | 13 | |
|     Reserved | 4 | |
|     ES_info_length | 12 | |
|     for (i=0; i<N2; i++) { | | |
|       descriptor( ) | | |
|     } | | |
|   } | | |
|   CRC32 | 32 | |
| } | | |

The 3D program descriptor (3D_program_descriptor) described above may be inserted into a descriptor loop located posterior to program_info_length in the PMT. As the 3D program descriptor (3D_program_descriptor) is inserted into the PMT, it can be provided that the corresponding program is a stereoscopic 3D program. Since the inserted 3D program descriptor (3D_program_descriptor) is recognized as a private description that cannot be interpreted in the conventional 2D program receiver, the corresponding program is recognized as the conventional 2D program in the conventional 2D program receiver.

In the present invention, the use of 'stream_type' defined in the PMT is limited in the composition of the PMT so that a malfunction does not occur in the conventional 2D program receiver. First, a second for loop in the PMT refers to a loop representing information on each elementary stream (ES), and the elementary stream refers to a stream generated by encoding video data. In the present invention, the video stream is a stream containing video data, and the elementary stream is included in the concept of the video stream. Accordingly, the use of the 'stream_type' defined in the PMT will be described. The conventional 2D program is composed of only one video stream. In a case where the stereoscopic 3D program is composed of two video streams, contents for two elementary streams are necessarily inserted into the second for loop in the PMT. In this case, it is difficult to determine which video stream is selected from the two video streams in the conventional 2D program receiver, and therefore, a malfunction may occur. Thus, in the present invention, the 'stream_type' of the video stream for the reference image is described as an identifier that the 2D receiver can recognize, and the 'stream_type' of the video stream for the additional image is described as an identifier that can the 2D receiver cannot recognize. As a specific embodiment, the 'stream_type' of the video stream for the reference image uses a type value defined in the MPEG-2 system standard, and the 'stream_type' of the video stream for the additional image uses a value that can be used as the user_private in the MPEG-2 system standard. Accordingly, the conventional 2D program receiver can recognizes the video stream for the additional image as a data stream that the 2D program receiver cannot interpret, and select only the reference image. On the other hand, the stereoscopic 3D program receiver can reproduce a stereoscopic 3D program by recognizing the video stream as an additional image and liking the additional image with the reference image.

The 'stream_type' of the video stream for the additional image may be used in a first embodiment illustrated in the follow Table 6, or may be used in a second embodiment illustrated in the following Table 7.

TABLE 6

| Stream_type for additional image | Description |
|---|---|
| 0x90 | MEPG-2 video stream as defined in ITU-T Rec. H.264 \| ISO/IEC 13818-2 Video |
| 0x91 | AVC video stream as defined in ITU-T Rec. H.264 \| ISO/IEC 14496-10 Video |

TABLE 7

| Stream_type for additional image | Description |
|---|---|
| 0x90 | MEPG-2 video stream as defined in ITU-T Rec. H.262 \| ISO/IEC 13818-2 Video, or, AVC video stream as defined in ITU-T Rec. H.264 \| ISO/IEC 14496-10 Video |

In the present invention, additional video stream information descriptor (stereoscopic_ES_info_descriptor) illustrated in FIG. 5 is defined so as to provide additional information on the additional video stream.

Referring to FIG. 5, descriptor_tag 505 is a field for identifying a descriptor, and has a value of 0xC1 as an embodiment. Descriptor_length 510 is a field representing the length of the descriptor (stereoscopic_ES_info_descriptor), and may represent the number of bytes posterior to the descriptor_length 510 as an embodiment.

Stereoscopic_stream_type 515 represents a type of the corresponding ES, and is identical to the system_type defined in the ISO/IEC 13818-1 MPEG-2 system standard. In a case where the stream_type for the additional image is implemented as the second embodiment of Table 7, it can be recognized that the corresponding video stream is an additional video stream, but it cannot be recognized that the corresponding video stream is an MPEG-2 video stream or AVC video stream. Thus, the type (kind) of the corresponding video stream can be identified using the stereoscopic_stream_type 515 having a value in the following Table 8. However, in a case where the stream_type for the additional image is implemented as the first embodiment of Table 6, it can be recognized that the corresponding video stream is an additional video stream, and it can also be recognized that the corresponding video stream is an MPEG-2 video stream or AVC video stream. Thus, in a case where the stream_type for the additional image is implemented as the first embodiment of Table 6, the stereoscopic_stream_type 515 is necessarily removed as an unnecessary field.

TABLE 8

| Value | Description |
| --- | --- |
| 0x02 | MPEG-2 video stream as defined in ITU-Rec H.262 | ISO/IEC 13818-2 Video |
| 0x1B | AVC video stream as defined in ITU-T Rec. H.264 | ISO/IEC 14496-10 Video |

Stereoscopic_view_info_flag 520 is a field for determining whether the corresponding ES is a left image stream or right image stream. The left image stream may be displayed when the stereoscopic_view_info_flag 520 has a value of '1', and the right image stream may be displayed when the stereoscopic_view_info_flag 520 has a value of '0'. In an extended embodiment, the stereoscopic_view_info_flag 520 may represent of which view image the corresponding ES in the multi-view program is a video stream, and the number of bits may be added as occasion demands.

Stereoscopic_group_PID 525 represents an identifier of the reference video stream corresponding to the additional video stream, and may be, for example, a packet ID (PID) of a packet containing the reference video stream to be transmitted. Accordingly, the relation of the corresponding additional video stream with other video streams can be recognized. Specifically, it can be recognized that the corresponding additional video stream is a video stream corresponding to the reference video stream having the PID represented by the stereoscopic_group_PID 525. Thus, the stereoscopic 3D program can be reproduced at the receiving stage using the corresponding additional video stream and the corresponding reference video stream. In an extended embodiment, the stereoscopic_group_PID 525 may represent information on how the corresponding additional video stream is related to other video streams constituting the multi-view program, and an additional field may be used in addition to the stereoscopic_group_PID 525 as occasion demands. For example, in a case where the multi-view program is composed of first, second and third images and the corresponding additional video stream is an additional video stream containing the second view image, the relation between video streams of the view images can be recognized through information on the identifier of a reference video stream containing the first view image and the identifier of another reference video stream containing the third view image.

The additional video stream information descriptor (stereoscopic_ES_info_descriptor) may contain a reserved field as illustrated in FIG. 5. Each of the fields defined in the additional video stream information descriptor (stereoscopic_ES_info_descriptor) described above may be used individually or through various combinations. Each of the fields may also be used in various tables defined in the digital broadcasting system or user (private) data areas of a packetized elementary stream (PES).

Hereinafter, a case where the 3D program descriptor (3D_program_descriptor) is applied to the AEIT of the SI for providing guide information on programs will be described as another embodiment. Table 9 illustrates a structure the AEIT, and description of each data field defined by the corresponding standard will be omitted.

TABLE 9

| Grammar | Number of bits | Restriction |
| --- | --- | --- |
| aggregate_event_info_section( ) { | | |
|   table_id | 8 | |
|   section_syntax_indicator | 1 | |
|   private_indicator | 1 | |
|   reserved | 2 | |
|   section_length | 12 | |
|   AEIT_subtype | 8 | |
|   MGT_tag | 8 | |
|   Reserved | 2 | |
|   version_number | 5 | |
|   current_next_indicator | 1 | |
|   section_number | 8 | |
|   last_section_number | 8 | |
|   if(AEIT_subtype == 0){ | | |
|     num_sources_in_section | 8 | |
|     for(j=0;j< | | |
| num_sources_in_section;j++){ | | |
|       source_ID | 16 | |
|       num_events | 8 | |
|       for(j=0;j< | | |
| num_events;j++){ | | |
|         Reserved | 2 | |
|         event_ID | 14 | |
|         start_time | 32 | |
|         reserved | 2 | |
|         ETM_present | 2 | |
|         duration | 20 | |
|         title_length | 8 | |
|         title_text( ) | Var | |
|         reserved | 4 | |
|         Descriptor_length | 12 | |
|         for(i=0;i<N;i++){ | | Third for loop |
|           descriptor( ) | | Insert 3D_program_descriptor |
|         } | | |
|       } | | |
|     } | | |
|   } | | |
|   else | | |
|     Reserved | n*8 | |
|   CRC_32 | 32 | |
| } | | |

The 3D program descriptor (3D_program_descriptor) described above may be inserted into the third for loop in the AEIT. The structure of the EIT in the PSIP is identical to that of the AEIT, and therefore, its embodiment will be omitted. The AEIT provides program schedule information for each time to service channels, and the inserted 3D program descriptor (3D_program_descriptor) represents that the corresponding program (event) is a stereoscopic 3D program.

Figure 6:
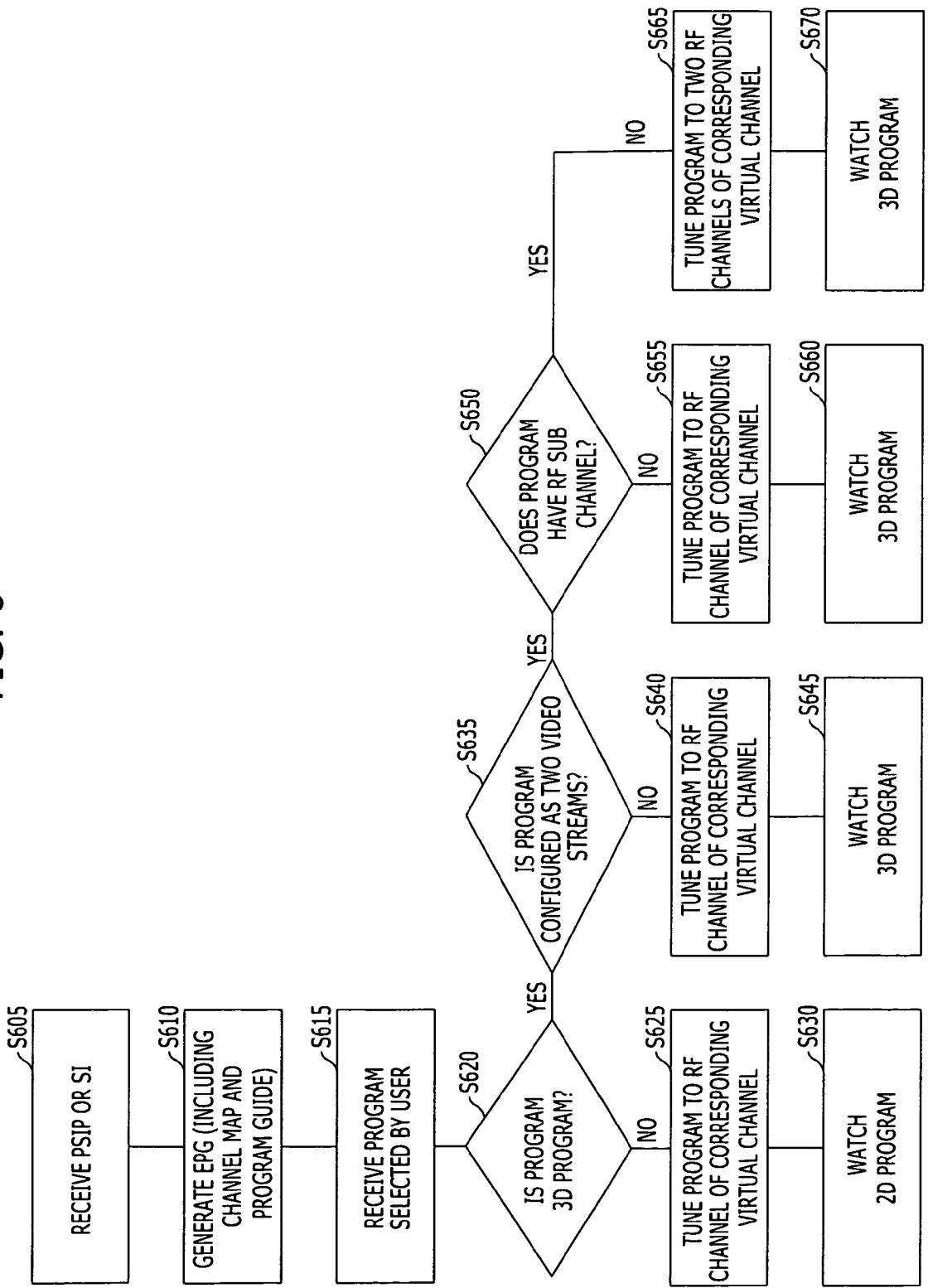
FIG. 6 is a flowchart illustrating a method for receiving a multi-view program composed of a plurality of video streams through a plurality of physical channels in accordance with an embodiment of the present invention.

Hereinafter, a method for receiving a multi-view program (including a stereoscopic 3D program) composed of a plurality of video streams through a plurality of physical channels in accordance with an embodiment of the present invention will be described with reference to FIG. 6. Here, contents overlapping with those described above will be omitted.

First, a receiver receives initial PSIP or SI information (S605), and generates a channel map and an electronic program guide (EPG) containing program schedule information for each channel (S610).

Then, the receiver receives a program selected by a user (S615). The user may select a program desired to watch from the generated EPG.

The receiver determines whether the selected program is a 2D program or multi-view program (S620). In this case, the receiver may determine whether the selected program is a 2D program or multi-view program through whether a 3D program descriptor (3D_program_descriptor) for the corresponding program exists in an EIT of the PISP or an AEIT of the SI or the 3D_flag 415 in the 3D program descriptor (3D_program_descriptor) for the corresponding program. When the 3D program descriptor (3D_program_descriptor) for the corresponding program exists or when the 3D_flag 415 has a value of '1', the receiver can determine that the selected program is a multi-view program (S620: YES).

In a case where the selected program is not a multi-view program, i.e., a 2D program (S620: NO), the receiver performs tuning to a physical channel of a corresponding virtual channel (S625), and reproduces the 2D program (S630). Accordingly, the user watches the 2D program (S630).

In a case where the selected program is a multi-view program (S620: YES), the receiver determines whether the corresponding program is a program composed of one video stream or a program composed of two video streams by identifying the composition type of the corresponding program (S635). Particularly, in a case where the selected program is a stereoscopic 3D program (S620: YES), the receiver may determine whether the corresponding program is a program composed of one video stream or a program composed of two video streams by identifying the composition type of the corresponding program (S635). The receiver may determine whether the corresponding program is a program composed of one video stream or a program composed of two video streams using the 3D_composition_type 420 in the 3D program descriptor (3D_program_descriptor) for the corresponding program. For example, when the 3D_composition_type 420 is '0110', the receiver can determine that the corresponding stereoscopic 3D program is composed of two video streams.

In a case where the selected program is a multi-view program composed of one video stream (S635: NO), the receiver performs tuning to a physical channel of a corresponding virtual channel (S640), and reproduces the stereoscopic 3D program composed of one video stream (S645). Accordingly, the user watches the stereoscopic 3D program (S645).

In a case where the selected program is a multi-view program composed of two or more video streams (S635: YES), the receiver determines whether a separate physical channel (physical subchannel) is used to transmit one or more additional video streams (S650). Particularly, in a case where the selected program is a stereoscopic 3D program composed of two video streams (S635: YES), the receiver determines whether a separate physical channel (physical subchannel) is used to transmit the additional video stream (S650). The receiver may determines whether a separate physical channel (physical subchannel) is used to transmit the additional video stream through the subchannel_present 425 in the 3D program descriptor (3D_program_descriptor) for the corresponding program.

In a case where the selected multi-view program does not use the physical subchannel (S650: NO), the receiver performs tuning to a physical channel of a corresponding virtual channel (S655), and reproduces the multi-view program (S660).

In a case where the selected multi-view program uses the physical subchannel (S650: YES), the receiver performs tuning at an RF frequency of a plurality of physical channels through which the selected program is transmitted (S655). Frequency information for channel tuning at the steps S625, S640, S655 and S665 may be obtained through a VCT of the PSIP, an S-VCT of the SI or an L-VCT of the SI. That is, the frequency information of the physical channel matched to 'source_ID' in the VCT is obtained with reference to the 'source_ID' that is an identifier for the corresponding program in the EIT or AEIT. Accordingly, the receiver obtains information on a main physical channel through which a reference video stream is transmitted. In a case where the multi-view program is transmitted through two or more physical channels (S650: YES), a multi-channel descriptor (multi_channel_descriptor) for a corresponding virtual channel necessarily exists in the VCT, and frequency and composition information on the physical subchannel through which the additional video stream is transmitted can be obtained through the subchannel_type 320, subchannel_frequency 325 and modulation_mode 330 of the multi-channel descriptor (multi_channel_descriptor). The receiver receives a plurality of video streams constituting the multi-view program using information on the obtained main physical channel and information on the physical subchannel.

The receiver restores a reference image and one or more additional images from the reference and additional video streams obtained by performing tuning to a plurality of physical channels through which the corresponding program is transmitted and reproduces the multi-view program (S670). Accordingly, the user watches the multi-view program. In this case, the receiver restores the reference image and the one or more additional images using information on the composition of the multi-view program containing signaling information of the 3D program descriptor (3D_program_descriptor) and an additional video stream information descriptor (stereoscopic_ES_info_descriptor), thereby reproducing the multi-view program.

The multi-view program may be used together with the 2D program. As an embodiment, 2D advertisement may be inserted into the middle of the stereoscopic 3D program. Thus, the receiver necessarily restores an image with reference to a PMT for transmitting program multiplexing information. Particularly, 2D-to-3D conversion may be performed with reference to signaling information of the 3D program descriptor (3D_program_descriptor) transmitted in the PMT (e.g., it can be determined that the current program is a 2D or 3D program using the 3D_flag.

Figure 7:
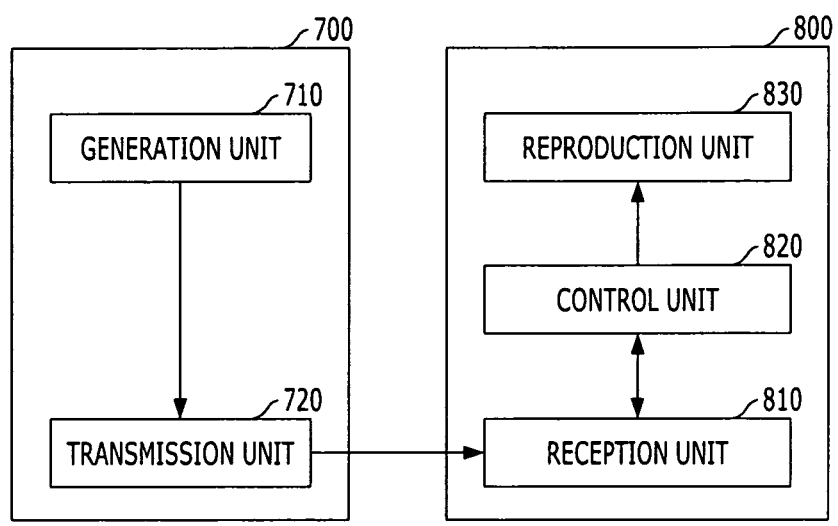
FIG. 7 is a configuration view illustrating a multi-view program transmitting apparatus and a multi-view program receiving apparatus in accordance with an embodiment of the present invention.

Hereinafter, the configuration of a multi-view program transmitting apparatus and a multi-view program receiving apparatus in a digital broadcasting system, which are implemented according to the aforementioned method, will be described with reference to FIG. 7. Here, contents overlapping with those described above will be omitted.

The multi-view program transmitting apparatus 700 includes a generation unit 710 and a transmission unit 720. The generation unit 710 generates information and a multi-view program, required according to the aforementioned method, and the transmission unit 720 transmits the information and multi-view program, generated in the generation unit 710 according to the aforementioned method. In a case where the multi-view program is composed of a plurality of video streams, the transmission unit 720 transmits each of the video streams through each physical channel.

The multi-view program receiving apparatus 800 includes a reception unit 810 and a control unit 820, and may further include a reproduction unit 830. The reception unit 810 receives the information and multi-view program, transmitted from the multi-view program transmitting apparatus 700 according to the aforementioned method, and the control unit 820 controls the reception unit 810 to receive the information and multi-view program, transmitted from the multi-view program transmitting apparatus 700 according to the aforementioned method. The reproduction unit 830 reproduces the multi-view program by obtaining the information and multi-view program, received by the reception unit 810, from the control unit 820 according to the aforementioned method.

The present invention provides a composition and transmitting method of signaling information required to receive a corresponding program using a receiver when a plurality of physical channels are used to transmit a stereoscopic 3D program in the digital broadcasting system. Particularly, the extensibility of the signaling information is considered so that extension to the multi-view program is possible in the future, and the signaling information that allows a malfunction not to occur is provided to ensure compatibility with the conventional 2D program receiver.

In the present invention, the signaling information enables the multi-view program including a stereoscopic 3D program with a large transmission bandwidth to be transmitted using the current digital broadcasting system, and high-quality real-sense broadcasting services can be provided in a fast period of time.

While the present invention has been described with respect to the specific embodiments, it will be apparent to those skilled in the art that various changes and modifications may be made without departing from the spirit and scope of the invention as defined in the following claims.

What is claimed is:

1. A method for transmitting a multi-view program composed of a plurality of video streams in a digital broadcasting system, the method comprising:
   generating information representing that the program is a multi-view program, information on a composition of the multi-view program and information on a plurality of physical channels through which the multi-view program is transmitted; and
   transmitting the multi-view program and the generated information through the plurality of physical channels, wherein:
   the plurality of video streams are one reference video stream and one or more additional video streams, wherein the reference video stream is a video stream containing a reference image, and the additional video stream is a video stream containing an additional image;
   the information on the composition of the multi-view program contains information representing that the multi-view program is composed of the plurality of video streams and information representing that the plurality of video streams are transmitted through the plurality of physical channels;
   the information on the plurality of physical channels contains information on a main physical channel through which the reference video stream is transmitted, the number of physical subchannels through which the additional video stream is transmitted and information on each of the physical subchannels; and
   said transmitting transmits the video stream through each of the physical channels based on the information on the composition of the multi-view program and the information on the plurality of physical channels,
   wherein the information on the plurality of physical channels are inserted into a first loop and a second loop in a data structure table of the digital broadcasting system,
   wherein the first loop indicates information on the main physical channel through which the reference video stream is transmitted,
   wherein the second loop indicates information on the physical subchannel through which the additional video stream is transmitted,
   wherein the information on the composition of the multi-view program are represented by being defined in a descriptor,
   wherein the descriptor is inserted into the data structure table, contains a field for identifying the descriptor and a field for representing length of the descriptor.

2. The method of claim 1, wherein the number of the physical subchannels and the information on each of the physical subchannels are contained in a private descriptor not recognized by a 2D receiver,
   wherein the private descriptor describes a modulation mode of the physical subchannel.

3. The method of claim 1, wherein the information on the main physical channel contains a carrier frequency of the main physical channel and a modulation mode of the main physical channel,
   wherein the information on the physical subchannel contains information on the video stream transmitted through the physical subchannel, a carrier frequency of the physical subchannel and a modulation mode of the physical subchannel,
   wherein the information on the video stream transmitted through the physical subchannel are defined by a type of the physical subchannel.

4. A method for transmitting a multi-view program composed of a plurality of video streams in a digital broadcasting system, the method comprising:
   generating information representing that the program is a multi-view program, information on a composition of the multi-view program and information on a channel through which the multi-view program is transmitted; and
   transmitting the multi-view program and the generated information through the channel, wherein:
   the plurality of video streams are one reference video stream and one or more additional video streams, wherein the reference video stream is a video stream containing a reference image, and the additional video stream is a video stream containing an additional image;
   the information on the composition of the multi-view program contains information representing that the multi-view program is composed of the plurality of video streams and information representing that the plurality of video streams are transmitted through the channel;

said transmitting transmits the video stream based on the information on the composition of the multi-view program and the information on the channel; and the information on the composition of the multi-view program further contains at least one of information representing which view image is the reference image and information representing which view image is used to watch the multi-view program as a 2D program, wherein the information on the channel are inserted into a first loop and a second loop in a data structure table of the digital broadcasting system, wherein the first loop indicates information on a main channel through which the reference video stream is transmitted, wherein the second loop indicates information on a sub-channel through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

5. A method for transmitting a multi-view program composed of a plurality of video streams in a digital broadcasting system, the method comprising:

generating information representing that the program is a multi-view program, information on a composition of the multi-view program and information on a channel through which the multi-view program is transmitted; and transmitting the multi-view program and the generated information through the channel, wherein:

the plurality of video streams are one reference video stream and one or more additional video streams, wherein the reference video stream is a video stream containing a reference image, and the additional video stream is a video stream containing an additional image;

the information on the composition of the multi-view program contains information representing that the multi-view program is composed of the plurality of video streams and information representing that the plurality of video streams are transmitted through the channel;

said transmitting transmits the video stream based on the information on the composition of the multi-view program and the information on the channel;

the information on the composition of the multi-view program contains information on each of the video streams and additional information on the additional video stream;

the information on each of the video streams contains information representing that a corresponding video stream is a reference video stream or additional video stream, wherein the information representing the corresponding video stream is a reference video stream is described as a stream type recognized by a 2D receiver, and the information representing that the corresponding video stream is an additional video stream is described as a stream type for identifying the kind of the additional video stream, not recognized by the 2D receiver; and the additional information on the additional video stream contains information representing for which view image the corresponding additional video stream is a video stream and information on a relation of the corresponding additional stream with other video streams, wherein the information on the channel are inserted into a first loop and a second loop in a data structure table of the digital broadcasting system, wherein the first loop indicates information on a main channel through which the reference video stream is transmitted, wherein the second loop indicates information on a sub-channel through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

6. A method for receiving a multi-view program composed of a plurality of video streams in a digital broadcasting system, the method comprising:

receiving information representing that the program is a multi-view program, information on a composition of the multi-view program and information on a plurality of physical channels through which the multi-view program is transmitted;

obtaining information representing that the multi-view program is composed of a plurality of video streams and information representing that the plurality of video streams are transmitted through the plurality of physical channels from the information on the composition of the received multi-view program, and obtaining information on a main physical channel through which the reference video stream is transmitted, the number of physical subchannels through which the additional video stream is transmitted and information on each of the physical subchannels from the received information on the plurality of physical channels; and receiving the plurality of video streams of the multi-view program through the respective physical channels based on the obtained information, wherein the plurality of video streams are one reference video stream and one or more additional video streams, wherein the reference video stream is a video stream containing a reference image, and the additional video stream is a video stream containing an additional image, wherein the information on the plurality of physical channels are inserted into a first loop and a second loop in a data structure table of the digital broadcasting system, wherein the first loop indicates information on the main physical channel through which the reference video stream is transmitted, wherein the second loop indicates information on the physical subchannel through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

7. The method of claim 6, wherein the number of the physical subchannels and the information on each of the physical subchannels are contained in a private descriptor not recognized by a 2D receiver, wherein the private descriptor describes a modulation mode of the physical subchannel.

8. The method of claim 6, wherein the information on the main physical channel contains a carrier frequency of the main physical channel and a modulation mode of the main physical channel,
  wherein the information on the physical subchannel contains information on the video stream transmitted through the physical subchannel, a carrier frequency of the physical subchannel and a modulation mode of the physical subchannel,
  wherein the information on the video stream transmitted through the physical subchannel are defined by a type of the physical subchannel.

9. The method of claim 6, further comprising reproducing the multi-view program based on the information representing the program is a multi-view program, information on the composition of the multi-view program and the received video streams.

10. A method for receiving a multi-view program composed of a plurality of video streams in a digital broadcasting system, the method comprising:
  receiving information representing that the program is a multi-view program, information on a composition of the multi-view program and information on a channel through which the multi-view program is transmitted;
  obtaining information representing that the multi-view program is composed of a plurality of video streams and information representing that the plurality of video streams are transmitted through the channel from the information on the composition of the received multi-view program, and obtaining information on a main channel through which the reference video stream is transmitted, the number of subchannels through which the additional video stream is transmitted and information on each of the subchannels from the received information on the channel; and
  receiving the plurality of video streams of the multi-view program through respective channels based on the obtained information,
  wherein the plurality of video streams are one reference video stream and one or more additional video streams, wherein the reference video stream is a video stream containing a reference image, and the additional video stream is a video stream containing an additional image,
  wherein the information on the composition of the multi-view program further contains at least one of information representing which view image is the reference image and information representing which view image is used to watch the multi-view program as a 2D program,
  wherein the information on the channel are inserted into a first loop and a second loop in a data structure table of the digital broadcasting system,
  wherein the first loop indicates information on the main channel through which the reference video stream is transmitted,
  wherein the second loop indicates information on the subchannel through which the additional video stream is transmitted,
  wherein the information on the composition of the multi-view program are represented by being defined in a descriptor,
  wherein the descriptor is inserted into the data structure table, contains a field for identifying the descriptor and a field for representing length of the descriptor.

11. A method for receiving a multi-view program composed of a plurality of video streams in a digital broadcasting system, the method comprising:
  receiving information representing that the program is a multi-view program, information on a composition of the multi-view program and information on a channel through which the multi-view program is transmitted;
  obtaining information representing that the multi-view program is composed of a plurality of video streams and information representing that the plurality of video streams are transmitted through the channel from the information on the composition of the received multi-view program, and obtaining information on a main channel through which the reference video stream is transmitted, the number of subchannels through which the additional video stream is transmitted and information on each of the subchannels from the received information on the channel; and
  receiving the plurality of video streams of the multi-view program through respective channels based on the obtained information, wherein:
  the plurality of video streams are one reference video stream and one or more additional video streams, wherein the reference video stream is a video stream containing a reference image, and the additional video stream is a video stream containing an additional image,
  the information on the composition of the multi-view program contains information on each of the video streams and additional information on the additional video stream;
  the information on each of the video streams contains information representing that the corresponding video stream is a reference video stream or additional video stream, wherein the information representing the corresponding video stream is a reference video stream is described as a stream type recognized by a 2D receiver, and the information representing that the corresponding video stream is an additional video stream is described as a stream type for identifying the kind of the additional video stream, not recognized by the 2D receiver; and
  the additional information on the additional video stream contains information representing for which view image the corresponding additional video stream is a video stream and information on a relation of the corresponding additional stream with other video streams,
  wherein the information on the channel are inserted into a first loop and a second loop in a data structure table of the digital broadcasting system,
  wherein the first loop indicates information on the main channel through which the reference video stream is transmitted,
  wherein the second loop indicates information on the subchannel through which the additional video stream is transmitted,
  wherein the information on the composition of the multi-view program are represented by being defined in a descriptor,
  wherein the descriptor is inserted into the data structure table, contains a field for identifying the descriptor and a field for representing length of the descriptor.

12. An apparatus for transmitting a multi-view program composed of a plurality of video streams in a digital broadcasting system, the apparatus comprising:
  a generation unit configured to generate information representing that the program is a multi-view program, information on a composition of the multi-view program and information on a plurality of physical channels through which the multi-view program is transmitted; and a transmission unit configured to transmit the multi-view program and the generated information through the plurality of physical channels, wherein:

the plurality of video streams are one reference video stream and one or more additional video streams, wherein the reference video stream is a video stream containing a reference image, and the additional video stream is a video stream containing an additional image;

the information on the composition of the multi-view program contains information representing that the multi-view program is composed of a plurality of video streams and information representing that the plurality of video streams are transmitted through the plurality of physical channels;

the information on the plurality of physical channels contains information on a main physical channel through which the reference video stream is transmitted, the number of physical subchannels through which the additional video stream is transmitted and information on each of the physical subchannels; and the transmission unit transmits the video stream through each of the physical channels based on the information on the composition of the multi-view program and the information on the plurality of physical channels, wherein the information on the plurality of physical channels are inserted into a first loop and a second loop in a data structure table of the digital broadcasting system, wherein the first loop indicates information on the main physical channel through which the reference video stream is transmitted, wherein the second loop indicates information on the physical subchannel through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

13. The apparatus of claim 12, wherein the number of the physical subchannels and the information on each of the physical subchannels are contained in a private descriptor not recognized by a 2D receiver, wherein the private descriptor describes a modulation mode of the physical subchannel.

14. The apparatus of claim 12, wherein the information on the main physical channel contains a carrier frequency of the main physical channel and a modulation mode of the main physical channel, wherein the information on the physical subchannel contains information on the video stream transmitted through the physical subchannel, a carrier frequency of the physical subchannel and a modulation mode of the physical subchannel, wherein the information on the video stream transmitted through the physical subchannel are defined by a type of the physical subchannel.

15. The apparatus of claim 12, further comprising a reproduction unit configured to reproduce the multi-view program based on the information representing the program is a multi-view program, information on the composition of the multi-view program and the received video streams.

16. An apparatus for transmitting a multi-view program composed of a plurality of video streams in a digital broadcasting system, the apparatus comprising:

a generation unit configured to generate information representing that the program is a multi-view program, information on a composition of the multi-view program and information on a channel through which the multi-view program is transmitted; and a transmission unit configured to transmit the multi-view program and the generated information through the channel, wherein:

the plurality of video streams are one reference video stream and one or more additional video streams, wherein the reference video stream is a video stream containing a reference image, and the additional video stream is a video stream containing an additional image;

the information on the composition of the multi-view program contains information representing that the multi-view program is composed of a plurality of video streams and information representing that the plurality of video streams are transmitted through the channel;

the transmission unit transmits the video stream based on the information on the composition of the multi-view program and the information on the channel; and the information on the composition of the multi-view program further contains at least one of information representing which view image is the reference image and information representing which view image is used to watch the multi-view program as a 2D program, wherein the information on the plurality of physical channels are inserted into a first loop and a second loop in a data structure table of the digital broadcasting system, wherein the first loop indicates information on the main physical channel through which the reference video stream is transmitted, wherein the second loop indicates information on the physical subchannels through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

17. An apparatus for transmitting a multi-view program composed of a plurality of video streams in a digital broadcasting system, the apparatus comprising:

a generation unit configured to generate information representing that the program is a multi-view program, information on a composition of the multi-view program and information on a channel through which the multi-view program is transmitted; and a transmission unit configured to transmit the multi-view program and the generated information through the channel, wherein:

the plurality of video streams are one reference video stream and one or more additional video streams, wherein the reference video stream is a video stream containing a reference image, and the additional video stream is a video stream containing an additional image;

the information on the composition of the multi-view program contains information representing that the multi-view program is composed of a plurality of video streams and information representing that the plurality of video streams are transmitted through the channel;

the transmission unit transmits the video stream based on the information on the composition of the multi-view program and the information on the channel;

the information on the composition of the multi-view program contains information on each of the video streams and additional information on the additional video stream;

the information on each of the video streams contains information representing that the corresponding video stream is a reference video stream or additional video stream, wherein the information representing the corresponding video stream is a reference video stream is described as a stream type recognized by a 2D receiver, and the information representing that the corresponding video stream is an additional video stream is described as a stream type for identifying the kind of the additional video stream, not recognized by the 2D receiver; and the additional information on the additional video stream contains information representing for which view image the corresponding additional video stream is a video stream and information on a relation of the corresponding additional stream with other video streams, wherein the information on the channel are inserted into a first loop and a second loop in a data structure table of the digital broadcasting system, wherein the first loop indicates information on a main channel through which the reference video stream is transmitted, wherein the second loop indicates information on a subchannel through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

18. An apparatus for transmitting a multi-view program composed of a plurality of video streams in a digital broadcasting system, the apparatus comprising:

a reception unit configured to receive information representing that the program is a multi-view program, information on a composition of the multi-view program and information on a plurality of physical channels through which the multi-view program is transmitted; and a control unit configured to obtain information representing that the multi-view program is composed of a plurality of video streams and information representing that the plurality of video streams are transmitted through the plurality of physical channels from the information on the composition of the received multi-view program, and obtain information on a main physical channel through which the reference video stream is transmitted, the number of physical subchannels through which the additional video stream is transmitted and information on each of the physical subchannels from the received information on the plurality of physical channels, wherein:

the reception unit receives the plurality of video streams of the multi-view program through the respective physical channels based on the obtained information; and the plurality of video streams are one reference video stream and one or more additional video streams, wherein the reference video stream is a video stream containing a reference image, and the additional video stream is a video stream containing an additional image, wherein the information on the plurality of physical channel are inserted into a first loop and a second loop in a data structure table of the digital broadcasting system, wherein the first loop indicates information on the main physical channel through which the reference video stream is transmitted, wherein the second loop indicates information on the physical subchannel through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

19. The apparatus of claim 18, wherein:

the information on the main physical channel contains a carrier frequency of the main physical channel and a modulation mode of the main physical channel; and the information on the physical subchannel contains information on the video stream transmitted through the physical subchannel, a carrier frequency of the physical subchannel and a modulation mode of the physical subchannel; and the information on the video stream transmitted through the physical subchannel are defined by a type of the physical subchannel.

20. An apparatus for transmitting a multi-view program composed of a plurality of video streams in a digital broadcasting system, the apparatus comprising:

a reception unit configured to receive information representing that the program is a multi-view program, information on a composition of the multi-view program and information on a channel through which the multi-view program is transmitted; and a control unit configured to obtain information representing that the multi-view program is composed of a plurality of video streams and information representing that the plurality of video streams are transmitted through the channel from the information on the composition of the received multi-view program, and obtain information on a main channel through which the reference video stream is transmitted, the number of subchannels through which the additional video stream is transmitted and information on each of the subchannels from the received information on the channel, wherein:

the reception unit receives the plurality of video streams of the multi-view program through respective channels based on the obtained information;

the plurality of video streams are one reference video stream and one or more additional video streams, wherein the reference video stream is a video stream containing a reference image, and the additional video stream is a video stream containing an additional image;

the information on the composition of the multi-view program contains information on each of the video streams and additional information on the additional video stream;

the information on each of the video streams contains information representing that the corresponding video stream is a reference video stream or additional video stream, wherein the information representing the corresponding video stream is a reference video stream is described as a stream type recognized by a 2D receiver, and the information representing that the corresponding video stream is an additional video stream is described as a stream type for identifying the kind of the additional video stream, not recognized by the 2D receiver; and the additional information on the additional video stream contains information representing for which view image the corresponding additional video stream is a video stream and information on a relation of the corresponding additional stream with other video streams, wherein the information on the channel are inserted into a first loop and a second loop in a data structure table of the digital broadcasting system, wherein the first loop indicates information on a main channel through which the reference video stream is transmitted, wherein the second loop indicates information on a subchannel through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

21. An apparatus for transmitting a multi-view program composed of a plurality of video streams in a digital broadcasting system, the apparatus comprising:

a reception unit configured to receive information representing that the program is a multi-view program, information on a composition of the multi-view program and information on a channel through which the multi-view program is transmitted; and a control unit configured to obtain information representing that the multi-view program is composed of a plurality of video streams and information representing that the plurality of video streams are transmitted through the channel from the information on the composition of the received multi-view program, and obtain information on a main channel through which the reference video stream is transmitted, the number of subchannels through which the additional video stream is transmitted and information on each of the subchannels from the received information on the channel, wherein:

the reception unit receives the plurality of video streams of the multi-view program through respective channels based on the obtained information;

the plurality of video streams are one reference video stream and one or more additional video streams, wherein the reference video stream is a video stream containing a reference image, and the additional video stream is a video stream containing an additional image;

the information on the composition of the multi-view program further contains at least one of information representing which view image is the reference image and information representing which view image is used to watch the multi-view program as a 2D program, wherein the information on the channel are inserted into a first loop and a second loop in a data structure table of the digital broadcasting system, wherein the first loop indicates information on the main channel through which the reference video stream is transmitted, wherein the second loop indicates information on the subchannels through which the additional video stream is transmitted, wherein the information on the composition of the multi-view program are represented by being defined in a descriptor, wherein the descriptor is inserted into the data structure table, contains a field for identifying the descriptor and a field for representing length of the descriptor.

* * * * *